(No Model.) 5 Sheets—Sheet 1.

J. SHARPE.
CASH INDICATOR AND REGISTER.

No. 414,872. Patented Nov. 12, 1889.

Witnesses
J. W. Garner
Edward Cashman.

Inventor
John Sharpe
By his Attorney
Benj. R. Catlin (No Model.) 5 Sheets—Sheet 2.

J. SHARPE.
CASH INDICATOR AND REGISTER.

No. 414,872. Patented Nov. 12, 1889.

Witnesses
J. W. Garner
Edward Cashman.

Inventor
John Sharpe
By his Attorneys
Benj. R. Catlin (No Model.)  5 Sheets—Sheet 3.
J. SHARPE.
CASH INDICATOR AND REGISTER.

No. 414,872. Patented Nov. 12, 1889.

Witnesses  
J. W. Garner  
Edward Cashman.

By his Attorneys  
Benj. R. Catlin

Inventor  
John Sharpe (No Model.) 5 Sheets—Sheet 4.
J. SHARPE.
CASH INDICATOR AND REGISTER.
No. 414,872. Patented Nov. 12, 1889.
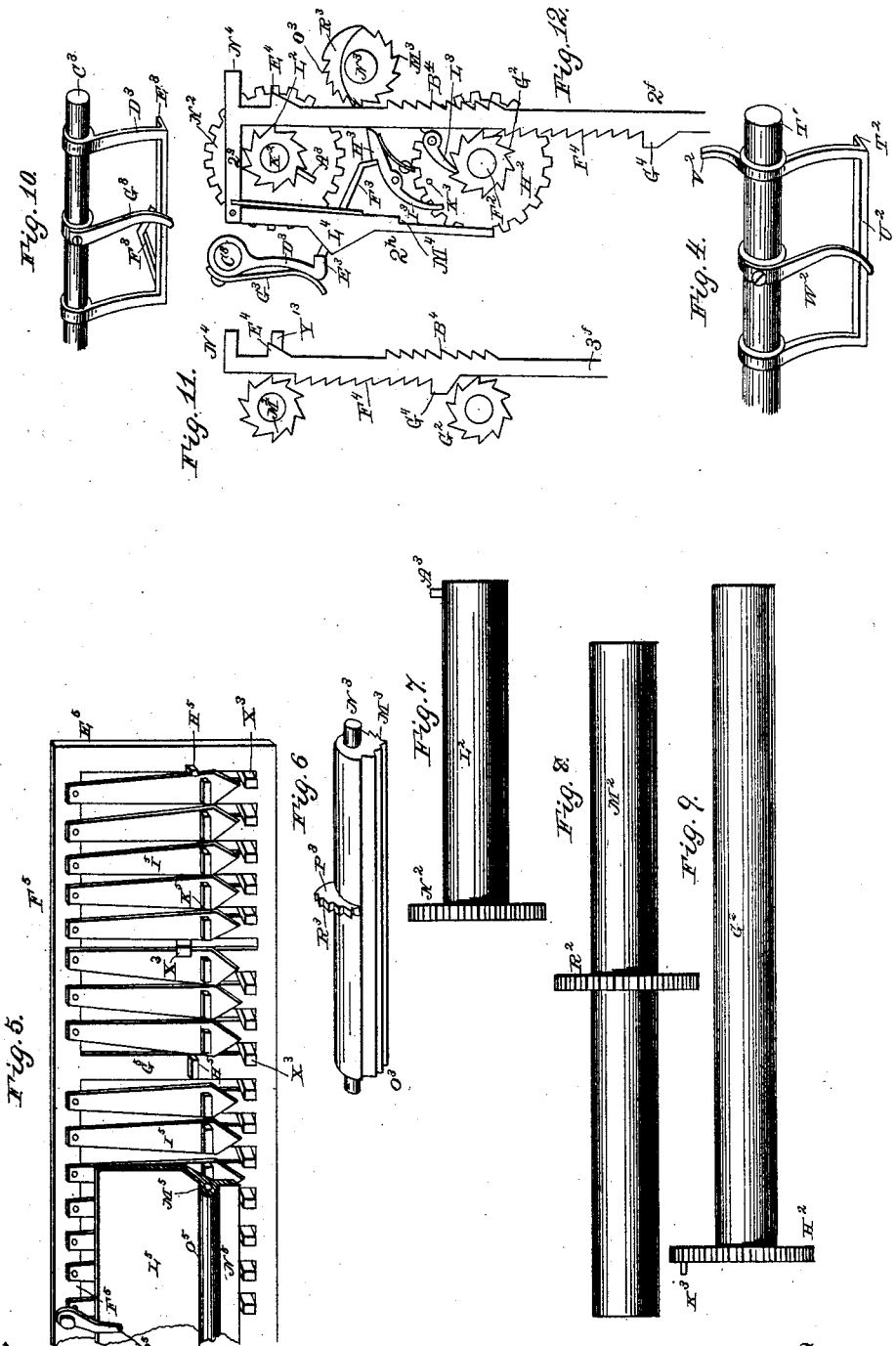

(No Model.) 5 Sheets—Sheet 5.
J. SHARPE.
CASH INDICATOR AND REGISTER.
No. 414,872. Patented Nov. 12, 1889.
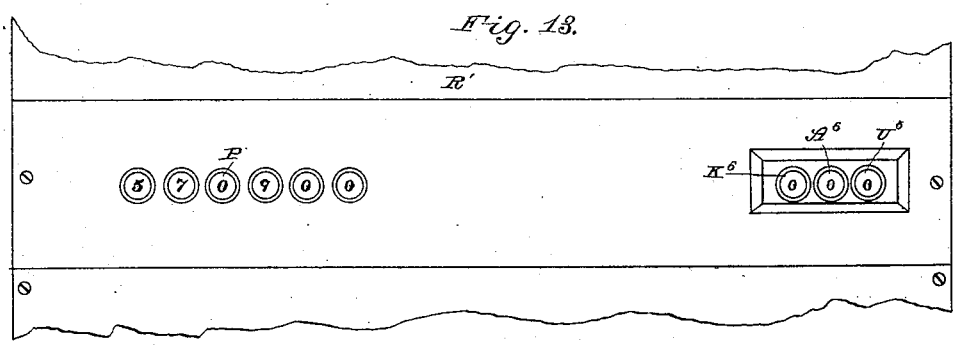
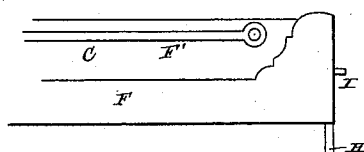
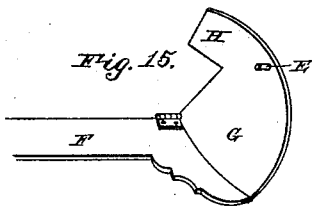
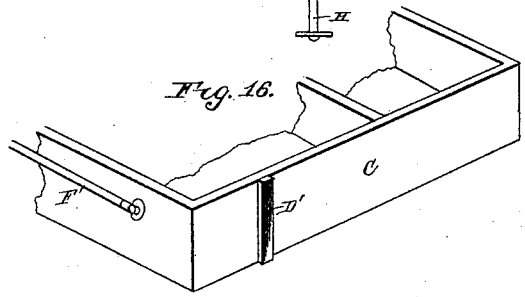
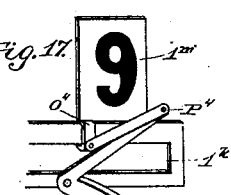
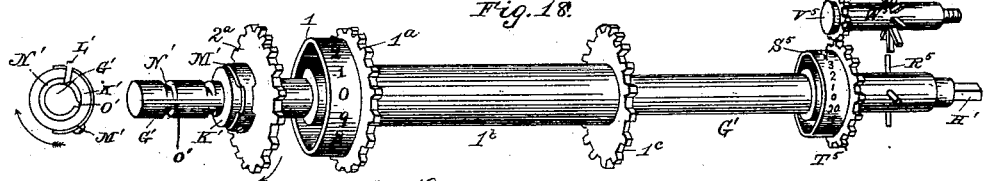
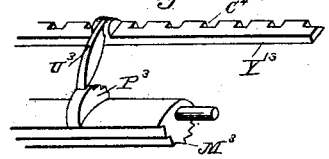
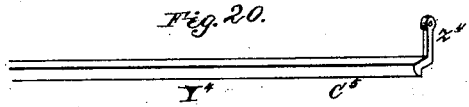
Witnesses
J. W. Garner
Edward Cashman
Inventor
John Sharpe
By his Attorneys
Benj. R. Catlin
N. PETERS, Photo-Lithographer, Washington, D. C.

UNITED STATES PATENT OFFICE.

JOHN SHARPE, OF TORONTO, ONTARIO, CANADA, ASSIGNOR OF ONE-THIRD TO ROBERT HARRISON REID, OF SAME PLACE.

CASH INDICATOR AND REGISTER.

SPECIFICATION forming part of Letters Patent No. 414,872, dated November 12, 1889.

Application filed April 20, 1889. Serial No. 308,041. (No model.)

*To all whom it may concern:*

Be it known that I, JOHN SHARPE, a resident of Toronto, in the Province of Ontario and Dominion of Canada, have invented certain new and useful Improvements in Cash-Registers; and I do hereby declare the following to be a full, clear, and exact description of the invention, such as will enable others skilled in the art to which it pertains to make and use the same.

My invention relates to an improvement in cash-registers; and it consists in the peculiar construction and combination of devices hereinafter described and claimed.

The object of my invention is to provide a cash-register which is adapted to register the amount of each sale and to keep a correct account of the sum total of all the sales for any desired length of time, and which is provided with safeguards to prevent it from registering inaccurate sums and to prevent it from being tampered with by dishonest persons to cause the machine to falsify the accounts.

A further object of my invention is to provide a cash-register which is adapted to be caused to register several amounts at the same instant.

A further object of my invention is to provide a cash-register which is positive and automatic in operation, is necessarily accurate, is strong and durable, and is not likely to get out of order.

These objects I attain by the mechanism hereinafter described, and illustrated in the accompanying drawings, in which—

Figure 1:
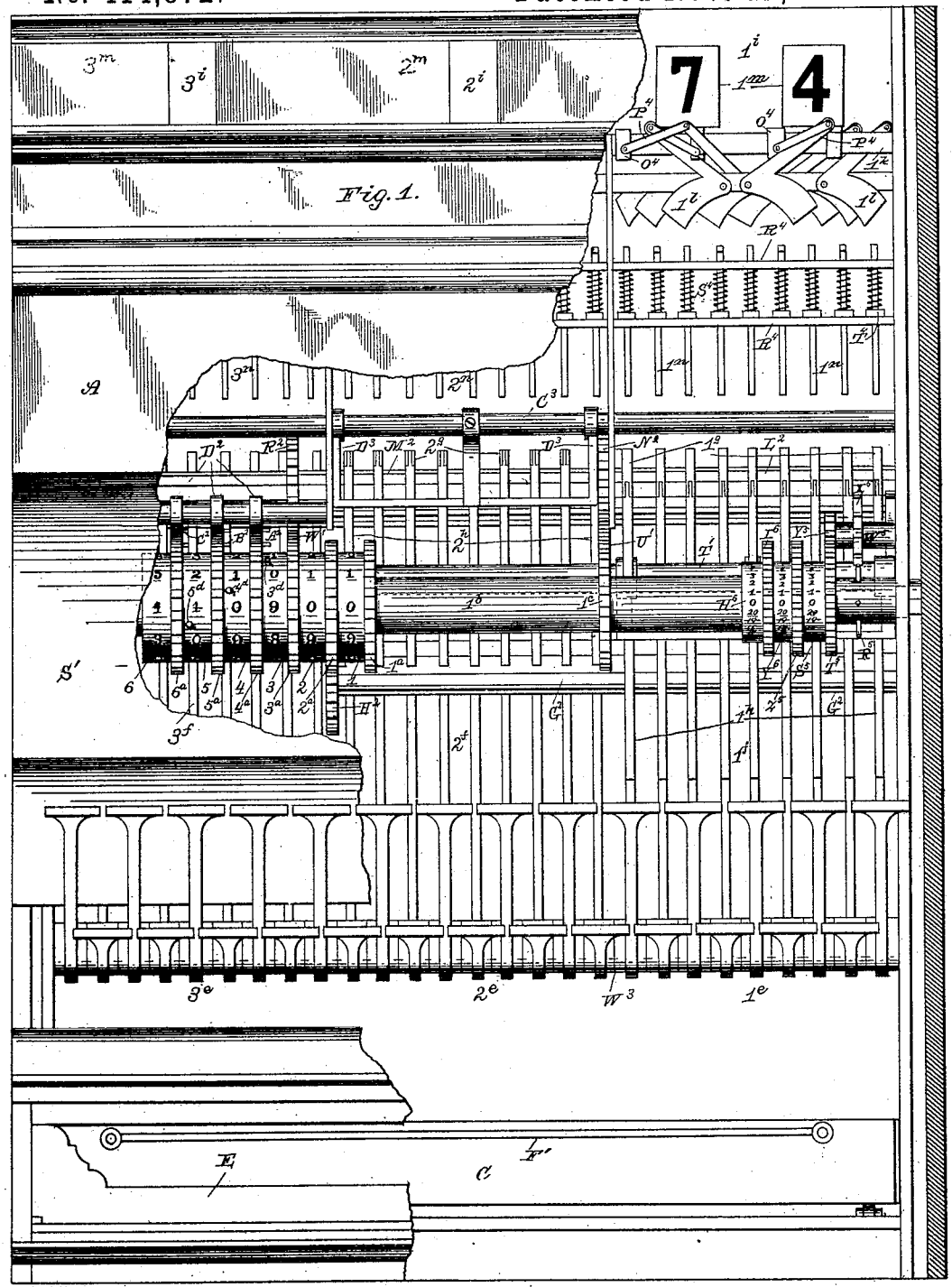
Figure 2:
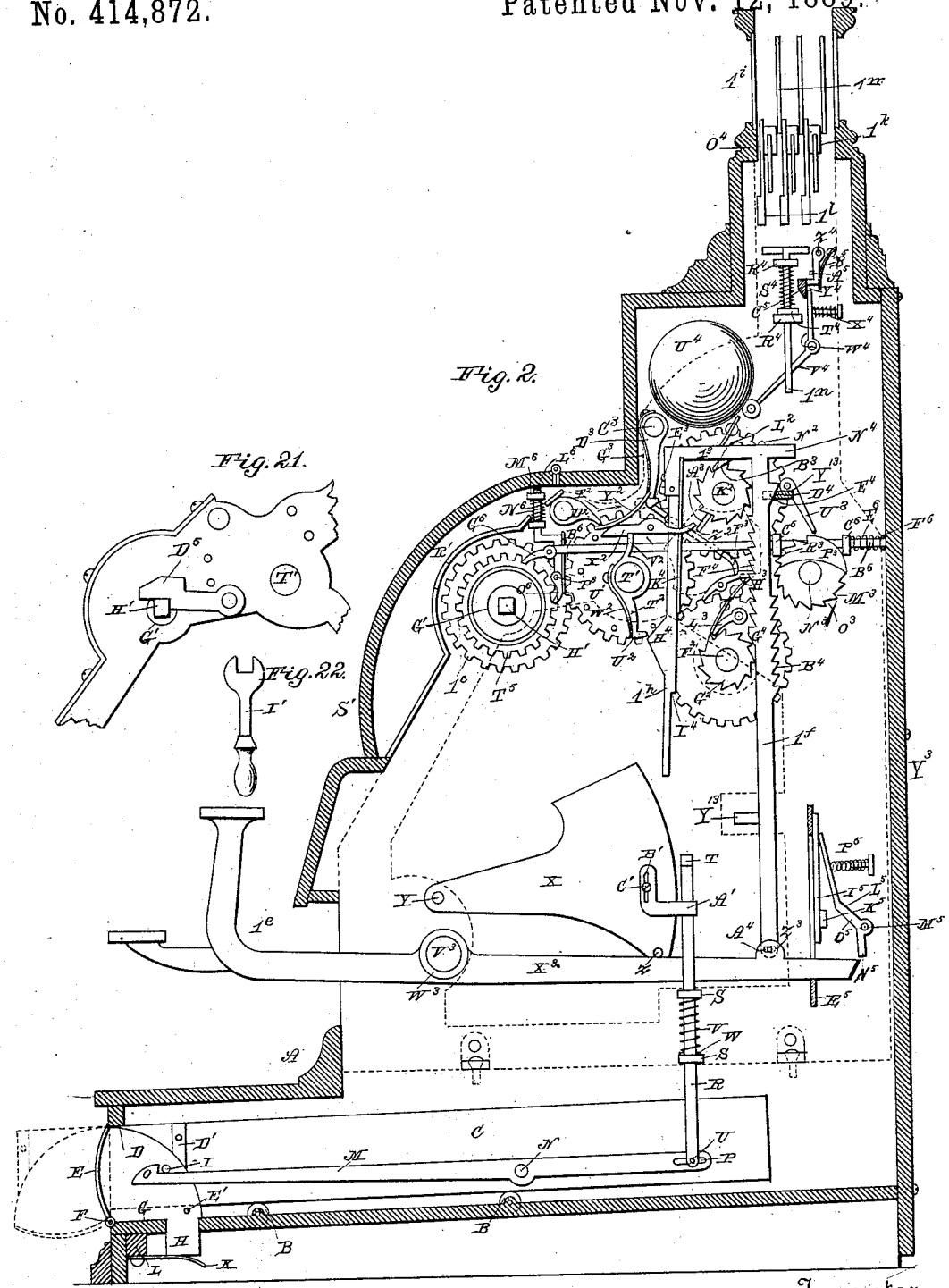
Figure 3:
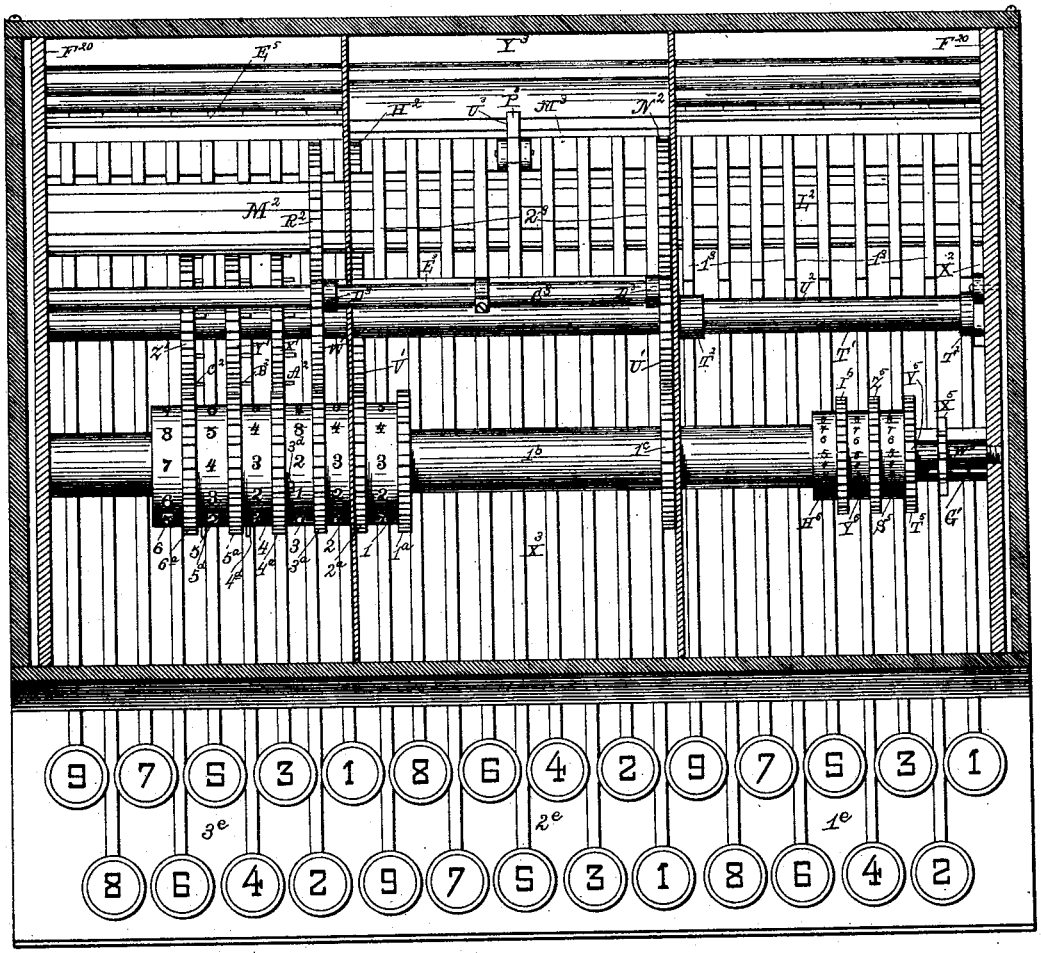

Figure 1 is a front elevation of a cash-register embodying my improvements, parts of the case being removed to disclose the interior mechanism. Fig. 2 is a vertical transverse sectional view of my improved cash-register. Fig. 3 is a horizontal sectional view of my improved cash-register, taken on a plane above the upper ends of the vertically-movable ratchet-bars, the front part of the case being removed to disclose the operating mechanism, and parts engaging the disks $Y^6$ $H^6$ being omitted for the sake of clearness. Fig. 4 is a detailed perspective view of the detent $T^2$. Fig. 5 is a detailed perspective view of the frame, swinging hangers, and lock-plate to prevent more than one key of each bank from being operated at the same time. Fig. 6 is a detailed perspective view of one of the ratchet-tumbler sleeves. Figs. 7, 8, and 9 are similar views of the ratchet-sleeves for operating the registering-disks. Fig. 10 is a detailed perspective view of one of the rocking detents. Fig. 11 is a detailed elevation of one of the ratchet-bars and two of the ratchet-sleeves. Fig. 12 is a similar view of another ratchet-bar, its link-arm, the ratchet-sleeves, rocking detent, dog to engage the same, and the ratchet-tumbler sleeve, illustrating the relative arrangement of the said parts. Fig. 13 is a detailed elevation of the plate which covers the registering mechanisms. Figs. 14, 15, and 16 are detailed views of the drawer and its guard-plate. Fig. 17 is a detailed view of one of the tablets and its operating weighted bell-crank lever. Fig. 18 is a detailed perspective view of the main shaft, and showing some of the registering-disks mounted thereon. Fig. 19 is a detailed perspective view of the notched guide-plate for the ratchet-bars, and showing one of the ratchet-tumbler sleeves and the pawl to engage the same. Fig. 20 is a detailed perspective view of the detent to lock the tumbler-rods. Fig. 21 is a partial elevation of one end of the interior frame supporting the mechanism. Fig. 22 is a detailed elevation of the wrench employed to set the registering-disks.

The bottom of the cabinet or case A is slightly inclined toward the front side of the case, and on the upper side of the bottom are mounted anti-friction rollers B, which support the cash-drawer C. An opening D is made in the front side of the case in front of the drawer, and through which the latter is adapted to slide when opened, and the said opening is covered by a shield-plate E, which is hinged at its lower edge, as at F. At the ends of the shield, and at right angles thereto, are quadrant-plates G, which extend into the case on opposite sides of the drawer and are provided at their lower inner corners with projecting shoulders H. Pins I project from the outer sides of the quadrant-plates, and are located about the centers of the quadrant-plates and near their curved edges, as shown. A pair of flat springs K are secured to a cross-bar L under the bottom of the case, and the free ends of the said springs bear up under the shoulders H and serve to throw the shield-plate E open and disclose the front end of the drawers when the shield-plate is released by the mechanism now to be described.

A pair of hooks M are mounted in the ends of the case on pivots N, and are arranged on opposite sides of the drawer. The shoulders O at the outer ends of the said hooks engage the pins I, and thereby normally retain the shield-plate in a closed position against the pressure of the springs K, and the inner ends of the said hooks are provided with elongated slots P. A pair of vertically-movable rods R is guided in openings in guide-brackets S, which are arranged in pairs and attached to the ends of the case above the drawer and one above the other, as shown. The upper ends of the rods R are bent outward at right angles to form tappets T, and the lower ends of the said rods are attached to the inner ends of the hooks by pins U, which work in the slots P. On the rods R are arranged coiled extensile springs V, which bear between the upper brackets and pins W on the rods and serve to normally force the latter down, and thereby retain the shoulders of the hooks in contact with the pins I. A pair of weight-arms X are arranged at the ends of the case and pivoted at their outer ends on pins Y. The lower inner corners of the said weight-arms are connected together by a rod Z, which extends lengthwise across the case, and hence causes the weight-arms to operate in unison. On the outer sides of the weight-arms are arranged right-angled tappet-arms A', which have slots B' in their vertical portions. Set-screws C' extend through these slots and enter threaded openings in the weight-arms and serve to secure the tappet-arms thereto and adapt the latter to be adjusted. The horizontal portions of the arms A' extend into the paths of the tappets T on the upper ends of rods R, and are adapted to engage the same when the weight-arms are raised by any of the keys, and thereby cause the said rods R to disengage the hooks O from the pins I, and thereupon the springs K open the shield-plate E. The opening D being thus uncovered, the drawer slides open by gravity, as will be readily understood.

On the sides of the drawer, at a suitable distance from the front side thereof, are secured vertical plates D', and from the inner sides of the quadrant-plates G, near the lower corners thereof, project pins E', which, when the shield-plate is thrown open by the springs, engage the rear sides of the plates D', and thereby impart the initial impulse to the drawer and start the same on its outward movement.

When closing the drawer, which may be done by pushing on the handle F' on the front side thereof, the plates D' engage the pins E', and as the drawer is moved inward the said pins travel down on the rear edges of the plates and serve to turn the shield-plate on its hinges against the pressure of the spring K and close the shield-plate over the opening D, when the hooks M engage again the pins I and lock the shield-plate in its closed position, and thus render it impossible to open the drawer without previously operating one of the keys.

Arranged in the case near the ends thereof, and rigidly secured in place in any suitable manner, are a pair of standard-plates $F^{20}$, which support all of the interior mechanism. The main shaft G' of the registering mechanism is journaled in bearings in the said standard-plates and extends entirely across the case near the front side thereof. At one end of the main shaft is formed an angular extension H', adapted to be engaged by a suitable wrench or key I'—such as illustrated in Fig. 22—and thereby the main shaft is adapted to be revolved in its bearings for the purpose of turning all the numbered disks to the zero or naught point, as will be presently described.

Arranged on the main shaft, and loosely and independently revoluble thereon, is a series of disks 1 2 3 4 5 6, each of which is provided on its periphery with a series of numerals from 0 to 9, arranged at suitable regular distances apart. The numerals on disk 1 indicate cents, those on disk 2 indicate dimes, those on disk 3 indicate dollars, those on disk 4 indicate tens of dollars, those on disk 5 indicate hundreds of dollars, and those on disk 6 indicate thousands of dollars. Of course the number of disks may be increased at will to adapt the machine for registering sums of any desired magnitude. The said disks are provided with spur-wheels $1^a$ $2^a$ $3^a$ $4^a$ $5^a$ $6^a$, respectively, the said spur-wheels being rigidly secured to or formed integrally with their respective disks, as may be preferred, and the said wheels being all of the same diameter and provided with the same number of teeth.

The hub or central sleeve K' of each disk carries a stop-pin L' and a spring M' to normally force the same inward. The inner ends of these pins are beveled on one side, as shown in Fig. 18, and said inner ends of the pins travel in annular grooves N' in the main shaft. Each groove N' has an offset or shoulder O', one side of which is inclined and the other side of which is radial. The stop-pins are arranged in the hubs or central sleeves of the disks in line radially with the naughts or zero-marks on said disks, and hence it follows that when the straight sides of the inner ends of the stop-pins are in engagement with the radial sides of the shoulders or offsets O' all of the disks will present their naughts or zero-marks to the openings P' of a cover-plate R', which plate is secured on the inclined front edges of the standard-plates. A hinged cover S', with which the case is provided and which is usually locked, is arranged over the plate R', and when the said cover S' is opened the openings P' are disclosed and the numbers on the disks presented to said openings can be read. A sleeve $1^b$ extends from one side of the wheel $1^a$ and is secured firmly thereto. The said sleeve is loose on the shaft G', and at the outer end of said sleeve is firmly secured a spur-wheel $1^c$, which is exactly similar to its fellow wheel $1^a$. A shaft T' is arranged parallel with the shaft G' and at a suitable distance therefrom, and has its ends rigidly secured to the standard-plates. On this shaft T' is loosely mounted a series of spur-wheels U' V' W' X' Y' Z', which are all of the same diameter and have the same number of teeth. The wheel U' engages the wheel $1^c$, the wheel V' engages the wheel $2^a$, the wheel W' engages the wheel $3^a$, the wheel X' engages the wheel $4^a$, the wheel Y' engages the wheel $5^a$, and the wheel Z' engages the wheel $6^a$.

The wheels X', Y', and Z' are each provided on one side with a series of tappet-pins $A^2$, $B^2$, and $C^2$, respectively, corresponding in number to the numerals on the disks—that is to say, there are ten of the said pins on each of the said wheels. Each disk 3 4 5 is provided with a radial tappet-pin $3^d$ $4^d$ $5^d$, respectively, which are in the paths of the pins on the wheels X', Y', and Z', and are arranged between the numerals 0 and 1 on their respective disks. Pawls $D^2$ engage the wheels X', Y', and Z', and serve to prevent the same from turning in a reverse direction from that indicated by the arrow $E^2$ in Fig. 2.

A shaft $F^2$ is arranged lengthwise between the standard-plates and parallel with and at a suitable distance in rear of and below the shaft T'. On this shaft $F^2$ is loosely mounted a sleeve $G^2$, which has ten ratchet-teeth, the width of which is equal to the length of the sleeve. Rigidly secured to the said sleeve is a spur-wheel $H^2$, which engages the loose similar spur-wheel V' on the shaft T', the latter wheel engaging the wheel $2^a$; hence when rotary motion is imparted to the said sleeve the disk 2 will be turned.

Arranged at a suitable distance above the shaft $F^2$ and parallel therewith is a shaft $K^2$, on which are loosely mounted a pair of ratchet-sleeves $L^2$ $M^2$, which are similar to the ratchet-sleeve $G^2$. The ratchet-sleeve $L^2$ has a spur-wheel $N^2$ that meshes with an idle-wheel U' on the shaft T', which idle-wheel engages the wheel $1^c$. The ratchet-sleeve $M^2$ has a spur-wheel $R^2$, that meshes with an idle-wheel W', also on shaft T', which idle-wheel W' meshes with the wheel $3^a$.

Loosely mounted on the shaft T' is a rocking detent $T^2$, that has a horizontal engaging-lip $U^2$ of suitable length. From one end of the detent projects an arm $V^2$. A spring $W^2$ is attached to the shaft at a point about midway between the ends of the rocking detent, and the free end of the spring bears against the rear side of the lip, and hence moves the same normally in one direction. A pivoted dog $X^2$ is normally held in engagement with the arm $V^2$ by a spring $Y^2$, and at the inner end of the dog is an arm $Z^2$, which is in the path of a tappet-pin $A^3$, that projects from the ratchet-sleeve $L^2$ at one end thereof. A spring-pressed pawl $B^3$ engages the said ratchet-sleeve to prevent the same from rotating in a reverse direction.

On a suitable shaft $C^3$ is loosely mounted a rocking detent $D^3$, which has a horizontal engaging-lip $E^3$ of suitable length, and from one end of the said detent depends an inclined arm $F^3$. A spring $G^3$ is attached to the shaft $C^3$, and its free end bears against the rear side of the lip $E^3$ and moves the detent normally in one direction. A spring-pressed dog $H^3$ normally engages and holds the arm $F^3$, and the arm $I^3$ of the dog is in the path of a tappet-pin $K^3$, that projects from the wheel $H^2$ at one end of the ratchet-sleeve $G^2$. A spring-pressed pawl $L^3$ engages the said ratchet-sleeve and holds the same against reverse rotation.

A substantially semi-cylindrical ratchet-tumbler sleeve $M^3$ is loosely journaled on a shaft $N^3$, and has a series—say eight—of ratchet-teeth $O^3$, which extend its entire length and are concentric with the shaft. That side of the tumbler which is provided with ratchet-teeth is necessarily heavier than the other or cut-away side thereof, and therefore the ratchet-tumbler is normally in the position shown. On the center of the cut-away portion of the ratchet-tumbler is a semi-circular web or flange $P^3$, which is provided with ratchet-teeth $R^3$. Arranged on the same shaft with the tumbler $M^3$, end to end, are a pair of similar ratchet-sleeve tumblers $S^3$ $T^3$. Gravity-pawls $U^3$ engage the flange or web ratchet-teeth $R^3$ of the respective tumblers. The function of the said tumblers will appear hereinafter.

On a suitable shaft $V^3$ are pivoted three banks of finger-keys $1^e$ $2^e$ $3^e$, there being nine keys in each bank, and the said keys of each bank being numbered, consecutively, from 1 to 9. Hubs or sleeves $W^3$ are formed on the arms of the keys, which bear against each other end to end and serve to space the said finger-keys to the necessary distance apart. The inward-extending arms $X^3$ of the finger-keys pass under the rod Z, which serves to connect the weight-arms, the said arms $X^3$ extending to within a short distance of the back $Y^3$ of the case. The said back is secured in place by screws or other suitable devices and is removable from the case. Each finger-key is independent of all the others and forms a lever of the first class.

Three series of vertically-movable ratchet-bars $1^f$ $2^f$ $3^f$ are maintained in position by guide-bars $Y^{13}$ or other suitable devices. There are as many of the ratchet-bars as there are finger-keys, and each ratchet-bar is pivoted at its lower end to the rear end of the arm $X^3$ of its respective finger-key by means of a pin $Z^3$, which operates in a slightly-elongated slot $A^4$ made transversely in the ratchet-bar. The ratchet-bars are arranged and maintained at a slight distance in front of the ratchet-tumbler sleeves, and each ratchet-bar has on its rear side a series of ratchet-teeth $B^4$, which correspond in number to and are adapted to engage the teeth $M^3$ of the ratchet-tumblers when the ratchet-bars are moved upward. The said ratchet-tumblers thus serve to keep the teeth $F^4$ of the ratchet-bars in engagement with the ratchet-sleeves while the ratchet-bars are moving upward, and when the ratchet-bars reach the upper limit of their stroke their teeth $B^4$ will, meshing with the teeth $M^3$ of the ratchet-tumblers, have turned the latter about half a revolution, so that the heavier sides are uppermost, and the impulse of the ratchet-bars causes the ratchet-tumblers to complete their revolution. It will be understood that while the teeth $M^3$ are out of engagement with the teeth $B^4$ the ratchet-bars will be free to descend by their own gravity and the assistance of the weight-arms X, their teeth slipping idly on the ratchet-sleeves, thus restoring the bars, tumbler-sleeves, and finger-keys to their initial position. The upper guide-bar $Y^{13}$ has on its front side a series of notches $C^4$, which receive the rear sides of the ratchet-bars and maintain the latter at the required distance apart, and the inner sides of said notches are inclined, as shown at $D^4$, Fig. 2. On the rear side of each ratchet-bar, near the upper end thereof, is an inclined offset cam $E^4$, which is adapted to engage the inclined side $D^4$ of its respective guide-notch when the ratchet-bar reaches the lower limit of its movement, and thereby move the upper end of the ratchet-bar forward and move its ratchet-teeth $F^4$ forward laterally into the path of its respective ratchet-sleeve.

The ratchet-teeth $F^4$ of the ratchet-bars of each bank of finger-keys vary in number from 1 to 9, respectively, and correspond to the value of the numerals on the said keys—that is to say, if the finger-key be numbered 9 the ratchet-teeth $F^4$ of the ratchet-bar attached to said finger-key will be nine in number, and so on. The ratchet-teeth $F^4$ of the bars of each bank of keys are adapted and designed to engage different ratchet-sleeves. In other words, the teeth on the ratchet-bars $1^f$, attached to the bank of keys $1^e$, are arranged to engage and rotate the sleeve $L^2$. The teeth on the ratchet-bars $2^f$, attached to the bank of keys $2^e$, are arranged to engage and rotate the sleeve $G^2$, and the teeth on the ratchet-bars $3^f$, attached to the bank of keys $3^e$, are arranged to engage and rotate the sleeve $M^2$; hence the said ratchet-teeth are differently located on the different sets of ratchet-bars.

At the lower end of each set of ratchet-teeth $F^4$ is a shoulder or stop $G^4$, which, by engaging its respective revoluble ratchet-sleeve when the ratchet-bar reaches the upper limit of its stroke, will absolutely prevent further rotation of the said sleeve, and hence prevent the numbered disk geared to and operated by the said sleeve from moving too far and registering the wrong number.

At the upper end of each ratchet-bar $1^f$ is a forward-extending arm $1^g$, and pivoted to the front end thereof is a depending link-arm $1^h$. Each of said link-arms has an offset shoulder $H^4$ on its front side, near its lower end, adapted to be engaged by the lip of the rocking detent $T^2$, and on the rear side of each of said link-arms, at a suitable distance from the lower end thereof, is a shoulder $I^4$, which is adapted to engage a tooth on the sleeve $G^2$, as will be hereinafter more fully described. A spring $K^4$, attached to each arm $1^g$, has its lower end bearing against the rear side of one of the link-arms, the function of the said springs being to normally hold the link-arms forward in position to cause their shoulders $I^4$ to be thrown out of engagement with the ratchet-sleeve $G^2$.

At the upper end of each ratchet-bar $2^f$ is a forward-extending arm $2^g$, and pivoted to the front end thereof is a depending link-arm $2^h$. Each of said link-arms has an offset shoulder $L^4$ on its front side, adapted to be engaged by the lip of the rocking detent $D^3$, and on the rear side of each of said link-arms $2^h$, at a suitable distance from the lower end thereof, is a shoulder $M^4$, which is adapted to engage with the ratchet-sleeve $M^2$.

The ratchet-bars $3^f$, or those attached to the last bank of keys, are not provided with link-arms such as hereinbefore described, but at the upper end of each ratchet-bar $1^f$, $2^f$, and $3^f$ is a rearward-extending arm $N^4$.

In the front side of the upper portion of the case is a series of three rectangular openings $1^i$ $2^i$ $3^i$, which correspond to the finger-keys in the several banks. The said openings are covered with transparent glass. Arranged behind the opening $1^i$, at suitable distances apart and in the same horizontal plane, is a series of three rectangular frames $1^k$. On the lower side of each frame, at suitable distances apart, is pivoted a series of three bell-crank levers $1^l$, which have their lower arms weighted at their outer ends, as shown. A series of tablets or indicators $1^m$ are provided at their lower sides with guide-loops $O^4$, which engage the upper sides of the frames $1^k$, and thereby secure the tablets or indicators thereto and adapt them to be moved laterally thereon. There are three of the said tablets on each frame, the said tablets on the various frames being arranged in oblique lines, and therefore partly behind each other, to effect the necessary economy of space and enable them to be compactly disposed in the case and to be presented singly to the opening, and the said tablets are connected to the upper arms of the bell-crank levers by means of links $P^4$. The said tablets are numbered from 1 to 9, consecutively, to correspond to the finger-keys of the bank $1^e$ and serve to indicate cents or units. The weighted bell-crank levers normally draw all of the tablets to one side behind the spaces between the openings 1¹, and thereby keep the same out of sight. A similar series of tablets (not shown, as they are concealed by the upper portion of the case in Fig. 1) are arranged behind the openings 2ⁱ and guided on frames similar to K', and connected to weighted bell-crank levers 2ˡ by links P⁴. The said tablets 2ᵐ are numbered from 10 to 90, and indicate dimes or tens, and correspond to the numerals or figures on the second banks of keys 2ᵉ. A similar series of tablets 3ᵐ are arranged behind the openings 3ⁱ, adapted to slide on frames 3ᵏ, and connected to weighted bell-crank levers 3ˡ by links P⁴. The said tablets 3ᵐ are numbered from 1 to 9, and indicate dollars or hundreds of units, and correspond to the numbers or values on the bank of keys 3ᵉ.

From the foregoing it will be understood that the highest value or sum that may be indicated by the tablets 1ᵐ 2ᵐ 3ᵐ when the tablet of highest value of each series is presented behind the respective openings, is $9.99, the sum appearing thus: "$9 - 90 cts -- 9 cts."

Arranged from end to end of the case, one above the other and at a suitable distance below the frames hereinbefore described, are a pair of horizontal guide-bars R⁴. In openings in the said guide-bars are arranged three sets of vertical tumbler-rods 1ⁿ 2ⁿ 3ⁿ, which have their upper ends arranged and adapted to engage the weighted arms of the bell-crank levers 1ˡ 2ˡ 3ˡ, respectively. The numbers of the tumbler-rods, bell-crank levers, tablets or indicators, ratchet-bars, and finger-keys are equal. The tumbler-rods are in the same vertical planes with the arms N⁴ of the ratchet-bars, and thereby when each of said ratchet-bars is operated by its finger-key its arm N⁴, as the ratchet-bar rises, strikes the lower end of its respective tumbler-rod, and thereby causes the appropriate tablet corresponding to the value of the sale or sum to be noted to appear before one of the openings in the case. Springs S⁴ are coiled on those portions of the tumbler-rods between their guide-bars R⁴, and the lower ends of said springs bear on collars T⁴ on said tumbler-rods, and thereby normally force the latter down, and hence permit the weighted bell-crank levers to move the tablets from behind the openings in the case.

A gong or bell U⁴ is mounted in one end of the case, and a pivoted hammer V⁴ is adapted to strike and sound the same. The said hammer has a vertical arm W⁴, against the rear side of which presses a coiled spring X⁴. A trip-bar Y⁴ is arranged lengthwise in the case and has vertical arms Z⁴ at its ends, which are pivoted to the standard-plates and serve to suspend the trip-bar and adapt it to oscillate. Studs A⁵, which project from the standard-plates, limit the forward movement of the trip-bar, and springs B⁵, which bear against the rear sides of the arms Z⁴, keep the latter normally in engagement with the studs. The vertical spring-pressed arm of the hammer engages the rear side of the trip-bar, and the front side of the latter is inclined or beveled to form a cam-face C⁵, which is in the paths of the collars T⁴.

When a finger-key is depressed to record a sale and its ratchet-bar forces up one of the tumbler-rods, the collar on the said rod as it rises engages the cam-face of the trip-bar, moves the latter rearward against the resistance of the spring, and causes the said trip-bar to impart a sudden movement to the hammer, and thereby cause the latter to sound the bell or gong. The force imparted by the finger-key to the ratchet-bar is sufficient to cause the latter to strike the lower end of the tumbler-rod with such force as to drive the collar on the tumbler-rod upward entirely across the cam-face of the trip-bar and to cause the latter to operate the hammer, as before stated. As soon as the collar passes up beyond the trip-bar the springs of the latter force it back under the collar, thereby retaining the latter and its tumbler-rod at the upper limit of their stroke, and consequently the bell-crank lever engaged by the upper end of the said tumbler-rod will be maintained in such position as to display its tablet before the appropriate opening until another sale is made and another finger-key is operated. When this is done, the instant the next ascending tumbler-rod collar engages the trip-bar and the latter is moved rearward the collar on the tumbler-rod, which has since the last sale been supported in an elevated position, will be released, when its spring will instantly force it down to its normal position, and its fellow weighted bell-crank lever will return the fellow tablet to its normal position out of sight to make way for the tablet announcing the amount of the most recent sale.

The operation then of the sales-registering mechanism is as follows: Before the initial operation of the machine all of the disks 1 2 3 4 5 6 must be turned with their 0 or zero marks opposite the opening P', and this may be effected by applying the wrench or key I' to the squared end H' of shaft G' and turning said shaft in the direction of the arrows in Fig. 18 until the shoulders or offsets O', by engaging with the pins L, range all the 0-marks of the disks in line with each other and with the opening P'. We will assume that the first sale that is made is of the value of five cents. The salesman depresses the key 5 of the bank 1ᵉ, and by so doing causes the ratchet-bar attached to said key and having five ratchet-teeth F⁴ to ascend, and while so doing engages the ratchet-sleeve L² and turns the same on its shaft through a space equal to the width of five ratchet-teeth or five-tenths of its circumference. This sleeve being geared to the disk 1 by the wheels 1ᶜ, 1ª, U', sleeve 1ᵇ, and N² causes the said disk to also rotate through the same proportion of its circumference, and thereby presents the number 5, indicating cents, to the appropriate opening P'. At the same instant the said ratchet-bar operates the tumbler-rod connected to the tablet in series $1^m$ having the number 5 and causes the said tablet to be moved to display through the opening $1^i$ indicating cents, and retained there in the manner before described, and the bell or gong is rung, as also before described. The same initial impulse of the finger-key which operated the ratchet-bar and registering mechanism will also cause the bar Z to rise and lift the weight-arms X, and hence cause the right-angled tappet-arms A' to draw the rods R upward and cause said rods to disengage the hooks from the studs I, when the springs K instantly throw the shield-plate E open, and the drawer opens, in the manner before described, to receive the cash. The weight-arms instantly, when the salesman removes his finger from the key, by causing the rod Z to depress the inner end of the finger-key, return the finger-key to its normal position and cause the ratchet-bar to descend with it. When another sale of the value, say, of four cents, has been made and the appropriate key operated, the sleeve $L^2$ will have been turned through nine-tenths of its revolution and will have brought its tappet-pin $A^3$ to a position adjacent to the upper side of the arm $Z^2$ of the dog $X^2$, and the disk 1 will have been turned to bring the number 9 or the sum of five and four before the appropriate opening P'.

We will assume that another sale of the value of one cent is now made and the appropriate finger-key depressed, which will cause the appropriate ratchet-bar of the series $1^f$, and having only one ratchet-tooth $F^4$, to engage the ratchet-sleeve $L^2$ on its ascent and turn the same through a distance equal to one space or the width of one tooth, and thereby complete the rotation of the said sleeve. As the latter effects this complete rotation the tappet-pin $A^3$, being in engagement with the arm $Z^2$ of dog $X^2$, as before stated, will depress said arm and cause the dog to release the arm $V^2$ of the rocking detent $T^2$, when the spring $W^2$ will instantly move the said detent rearward. On the succeeding descent of the ratchet-bar the said detent will engage the link-arm $1^h$, attached to said ratchet-bar, and said link-arm will be moved rearward thereby against the resistance of the spring $K^4$, and the shoulder $I^4$ of said link-arm will engage one of the teeth of the ratchet-sleeve $G^2$, geared to the tens-disk 2 by the mechanism hereinbefore described, and as the ratchet-bar and link-arm complete their descent the shoulder $I^4$ of the link-arm will rotate the sleeve $G^2$ through a space equal to one-tenth its circumference, and hence cause the tens-disk 2 to turn through one-tenth of a revolution from 0 to 1 and present the latter number to the appropriate opening P'. The shape of the shoulder $I^4$ is such that as soon as it has moved the sleeve $G^2$ one space the next succeeding ratchet-tooth of the said sleeve will engage the rear side of the link-arm and push the shoulder $I^4$ thereof out of engagement with the said sleeve $G^2$, and hence the latter will be only moved the required distance, and as the link-arm continues to descend after thus disengaged from the sleeve $G^2$ its offset shoulder or cam $H^4$ will engage the detent $T^2$, and in moving down across the lip thereof will return the said detent to its initial position (shown in Fig. 2) and cause its arm $V^2$ to be again engaged by the dog $X^2$, which will retain the rocking detent $T^2$ in its initial position until the sleeve $L^2$ has been moved through another complete revolution.

From the foregoing it will be understood that as often as the sum of the values registered by the bank of unit-keys $1^e$ exceeds ten the sleeve $L^2$ will be automatically operated to cause the tens-disk 2 to be moved one space and present its next highest number to the appropriate opening P'. When a sale in tens, or the multiple ten, or tenth part of a dollar, is effected—say a sale of the value of thirty cents—the operator depresses the appropriate key having the number 30 in the bank $2^e$, and thereby causes its ratchet-bar $2^f$ to operate the sleeve $G^2$ through a space equal to three-tenths of its circumference, and consequently the tens-disk 2 will be moved a corresponding distance by the gear-wheels which connect it to the sleeve $G^2$. I have assumed that the said disk 2 has been already moved one space by the previous operations of the link-arms of the ratchet-bar attached to the unit-keys of the bank $1^e$. Consequently the three spaces through which the said disk 2 is now turned by the aforesaid appropriate key and ratchet-bar of the bank $2^e$ will cause the number 40, or the sum of three tens plus one ten, to appear on said disk 2 through its appropriate opening P'.

It is understood from the description hereinbefore given of the tablets or indicators that the appropriate one will be displayed whenever a finger-key of any bank is operated. The highest number that may be registered by the disks 1 2 is 99, when the figures 9 of said disks are displayed through the openings. Each time that the sleeve $G^2$ is caused to make a complete revolution, either by the ratchet-bars attached to the keys $2^e$ or by the link-arms of the ratchet-bars attached to the keys $1^e$—that is to say, either by registering tens or the sums in tens of units—its tappet-pin $K^3$ will engage the arm $I^3$ of the dog $H^3$ and cause the latter to disengage the arm $F^3$ of the rocking detent $E^3$, and consequently on the succeeding descent of one of the ratchet-bars $2^f$ the said detent will engage the offset shoulder $M^4$ on the link-arm $2^h$, attached to said ratchet-bar, and said link-arm will be moved rearward thereby against the resistance of its spring, and the shoulder $M^4$ of said link-arm will engage one of the teeth of the ratchet-sleeve $M^2$, geared to the dollars or hundreds disk 3 by the mechanism hereinbefore described, and move said sleeve M² one space, and thereby operate the disk 3 one space and cause its next highest number to appear before the appropriate opening P'.

When a sale of the value of one or any number of dollars less than ten is effected, the salesman depresses the appropriate finger-key in the bank 3ᵉ and causes the ratchet-bar 3ᶠ, attached to said key, to partly turn the ratchet-sleeve M², and thereby rotate the disk 3 the required number of spaces to indicate the sum of the sales in dollars previously made plus the amount in dollars of the sale just being effected.

When the sum of all the sales registered is more than $9.99, the disk 3, indicating dollars, will be turned to such position as to cause its pin 3ᵈ to engage one of the pins A² of the wheel X' and move the latter one space, and hence cause the said wheel, which meshes with the wheel 4ᵃ, to move the latter and its disk 4 one space, and thereby cause the figure 1, indicating tens of dollars, on said disk to appear before the appropriate opening P', and so on until the said disk 4 has been caused to make a complete revolution. From the foregoing it will be understood that the highest amount the disks 1 2 3 4 are capable of registering is $99.99, and that this number will be registered by a single revolution of the disk 4. At each subsequent revolution of said disk 4 its tappet-pin 4ᵈ will be caused to engage one of the pins B² of the wheel Y' and move the latter one space, and hence cause the said wheel, which meshes with the wheel 5ᵃ, to move the latter and its disk 5 one space, and thereby cause the appropriate number on said disk indicating hundreds of dollars to appear before the appropriate opening P', and so on until the said disk 4 has been caused to make a complete revolution. The highest amount that the disks 1, 2, 3, 4, and 5 are capable of registering is $999.99.

At each subsequent revolution of the disk 5 its tappet-pin 5ᵈ will be caused to engage one of the pins C² of the wheel Z' and move the latter one space, and hence cause the said wheel, which meshes with the wheel 6ᵃ, to move the latter and its disk 6 one space, and thereby cause the appropriate number on said disk indicating thousands of dollars to appear before the appropriate opening P'.

The highest amount that the disks 1, 2, 3, 4, 5, and 6 are capable of registering is $9,999.99; but by increasing the number of disks and the operating wheels and pins the machine may be adapted to register sums up to any amount.

From the foregoing description it will be clear that three sums exclusively in units, tens, and hundreds may be registered simultaneously by depressing the appropriate finger-key of each bank.

A machine constructed with three banks of keys such as shown is capable of registering at a single operation any sum less than ten dollars; but by increasing the numbers of banks and ratchet-sleeves and ratchet-bars, link-arms, and detents the machine may be rendered capable of registering a sum of any desired amount. On one of the standard-plates is pivoted a detent D⁵, having a squared notch at its free end, which engages the squared end H' of the shaft G', and thereby holds the said shaft firm and prevents it from rotating, excepting when the said detent is disengaged from the shaft and the latter rotated by the wrench or key I' to set the disks to the zero or naught point, as before stated.

It is of importance to prevent more than one key of each bank from being operated at any time, for the reason that the ratchet-bars have varying numbers of teeth, and all the ratchet-bars of one set operate the same sleeve, which is geared to an indicating-disk, and therefore if two keys of a bank were depressed at once only the key operating the ratchet having the largest number of teeth would be effective in operating the registering mechanism and the value of the other key would be lost, and hence the efficiency of the machine would be impaired.

I have devised means to prevent the operation of more than one key of each bank at the same time, and the following is a description thereof: A rectangular open frame E⁵ is arranged in the case near the rear side thereof and extends from one standard-plate to the other. The said frame is divided into as many divisions F⁵ as there are banks of keys by means of vertical bars G⁵. The rear ends of the arms X³ of the finger-keys extend through the said divisions, and at the ends of the latter are stops or studs H⁵. Pivoted to the upper side of each division of the frame is a series of eight hangers I⁵, the lower ends of which extend into the spaces between the arms X³, there being one of said hangers between each pair of said arms, and the said lower ends of the hangers are beveled on opposite sides to a downward-extending point. The upper ends of the hangers are gradually narrowed, as shown, and the combined width of all the hangers in each division plus the width of one of the key-arms X³ is equal to the space between one pair of the stops or studs H⁵; hence when the rear end of one of the finger-key arms X³ is moved upward when the key is depressed the said arm moves the hangers laterally and the latter open only a sufficient distance to clear the said arm before they come in contact with the stops or studs H⁵, and consequently render it impossible to operate another key of the same bank. On the rear side of each hanger, at a suitable distance from the lower end thereof, is secured a cross-cleat K⁵, which cross-cleats serve to thicken the said hangers and prevent them from overriding each other in the event that their pivot-connection should work loose. Arranged across the case, near the rear side thereof, is a lock-plate L⁵, which has its ends provided with pivots M⁵, that engage bearings in the standard-plate. The said lock-plate is arranged at a slight distance in rear of the frame $E^5$ and has the depending flange $N^5$ and the inclined offset $O^5$, the latter extending toward the frame $E^5$, and the said flange $N^5$ of the lock-plate has its lower edge in a plane slightly higher than the upper sides of the finger-key arms when the latter are at rest. The flange $N^5$ is below the pivots $M^5$, and the offset $O^5$ is above the same. A spring $P^5$ bears against the rear side of the lock-plate at a point near its center and normally retains the lock-plate in the position shown in Fig. 2, with its flange $N^5$ inclined rearward a sufficient distance to clear the rear ends of the finger-key arms.

The operation of this portion of my invention is as follows: When a finger-key of one or more banks is depressed, the inner ends of the arms thereof rise, and by engaging the inclined offset $O^5$ partly turn the lock-plate on its pivot and cause the flange $N^5$ to move forward over the arms of the remaining keys, and hence lock them and prevent them from being operated until after the pressure on the finger-keys in use has been removed and the said keys have returned to their initial position, when the springs $P^5$ restore the lock-plate to the position it formerly occupied.

It is necessary to provide some means for indicating the number of times the registering-disks have been set to zero or naught in order to prevent tampering with the machine for dishonest purposes in the event of a somewhat prolonged absence of the proprietor, and I have devised the following for this purpose:

The shaft $G'$ is provided near its squared end $H'$ with pins $R^5$, which project therefrom and are four in number, and in line with the squared faces of end $H'$ and loose on the said shaft is a registering-disk $S^5$, which has a series of numbers on its periphery from 0 to 20, or any other suitable number, and has a spur-wheel $T^5$, with a similar number of teeth. An opening $U^5$ is made in the plate $R'$, to which the numbers on the disk are successively presented. A short shaft $V^5$ is secured to one of the standard-plates at a suitable distance above the shaft $G'$, and on said short shaft is mounted a revoluble sleeve $W^5$, which has a series of tappets or teeth $X^5$, adapted to be engaged by the pin $R^5$, and a pinion $Y^5$, with a similar number of teeth, that engage the wheel $T^5$. There being four pins $R^5$, corresponding to the squared end $H'$, each time the shaft $G'$ is turned through one-fourth of a revolution by the key or wrench $I'$ the tooth $X^5$, engaged by the pin $R^5$, will cause the sleeve to turn a sufficient distance to move the disk $S^5$, geared thereto, through one space; hence by noting the number seen through the opening $U^5$ when the machine is set or adjusted the proprietor when he returns can ascertain at a glance whether the machine has been set again during his absence.

It is also necessary to provide some means for indicating whether the back of the case is removed during the absence of the proprietor. To effect this I employ a disk $Y^6$, which is similar to the disk $S^5$ and has a spur-wheel $Z^5$. The numbers on the said disk pass before an opening $A^6$ in the plate $R'$. A rod $B^6$ is supported in a horizontal position by guides $C^6$ and extends from within a suitable distance of the wheel $Z^5$ to the removable rear side of the case. A coiled spring $E^6$ is arranged on the rear end of the said rod and bears between the rearmost guide $C^6$ and a transverse pin $F^6$. (See Fig. 2.) To the front end of the said rod is pivoted a pawl $G^6$, which engages the wheel $Z^5$ by gravity. When the back of the case is removed, the spring moves the rod rearward and causes the pawl to slip back on the spur-wheel and engage a tooth one space in rear of the tooth it formerly engaged, and when the back of the case is again placed in position it moves the rod forward against the resistance of the spring, and in so doing causes the pawl to move the wheel $Z^5$ and disk $Y^6$ one space, and thereby cause the appropriate number to appear before the opening $A^6$.

It is also necessary to provide a register for the lid $S'$ to indicate the number of times, if at all, the latter is opened during the absence of the proprietor. To effect this I provide a numbered disk $H^6$, which is exactly similar to the disks $S^5$ $Y^6$ and has a spur-wheel $I^6$. The said disk is also loosely mounted on the shaft $G'$, and its numbers appear in succession before an opening $K^6$ in the plate $R'$. A vertically-movable rod $L^6$ is guided in suitable supports $M^6$ and has its upper end normally pressed against the lid $S'$ by a spring $N^6$. To the lower end of the said rod is pivoted a pawl $O^6$, and a spring $P^6$ is attached to the rod and bears against the pawl and keeps the latter at all times in engagement with the wheel $I^6$. Whenever the lid $S'$ is raised, the spring $N^6$ moves the rod upward and causes the pawl to slip upon the wheel $I^6$ a distance of one tooth or space and engage another tooth thereof, and when the lid is closed it presses down on said rod and causes its pawl to move the wheel $I^6$ and disk $H^6$ a distance of one space, and thereby cause the appropriate number to appear before the opening $K^6$.

The plate $R'$ (shown in Fig. 2 and for the sake of clearness omitted from Figs. 1 and 3) covers the front sides of the various registering mechanisms, renders them inaccessible, and hence prevents them from being tampered with when the lid is opened. The various shafts, tumbler-sleeves, ratchet-sleeves, gears, and ratchet-bars render the registering mechanisms inaccessible from the rear when the back of the case is removed.

Having thus described my invention, I claim—

1. The combination of the registering-disks, the ratchet-sleeves geared thereto, the finger-keys and ratchet-bars to partly rotate the sleeves on one stroke of the ratchet-bars, and the link-arms to engage and complete the rotation of the sleeves on the return-stroke of the ratchet-bars, whereby units of a lower denomination will be carried to those of a higher denomination, substantially as described.

2. The combination of the ratchet-sleeves having the tappets, the registering-disks geared to the said sleeves, the dogs adapted to be operated by the tappets, the spring-pressed rocking detents adapted to be engaged by the dogs, the finger-keys, the ratchet-bars attached to and operated thereby and adapted to engage and partly rotate the ratchet-sleeves, and the link-arms attached to the ratchet-bars and having the shoulders to engage the ratchet-sleeves and the cams to engage the rocking detents, substantially as described.

3. The combination of the ratchet-sleeves, the finger-keys, the ratchet-bars attached to the keys and adapted to partly rotate the sleeves, and the link-arms connected to the ratchet-bars and having the shoulders $I^4$, adapted to engage and partly rotate the sleeves, whereby units of a lower denomination will be carried to those of a higher denomination, substantially as described.

4. The combination, in a registering-machine, of the ratchet-sleeves, the ratchet-bars to engage the same when moved in one direction, the link-arms attached to the ratchet-bars, and automatically-operating mechanism connecting said sleeves to said link-arms to cause the latter to engage and partly rotate the sleeves on the return-stroke of the ratchet-bars at predetermined periods of the revolution of the sleeves, whereby units of a lower denomination will be carried to those of a higher denomination, substantially as described.

5. The combination of the ratchet-sleeves, the ratchet-bars connected to the finger-keys, and the tumbler-sleeves to engage the ratchet-bars on the upstroke of the latter and move said bars into engagement with the ratchet-sleeves, substantially as described.

6. In a cash-register, the combination of the ratchet-sleeves, the registering-disks geared thereto, the ratchet-bars attached to the finger-keys, having the teeth on their front sides to engage the ratchet-sleeves on the upstrokes of the ratchet-bars, the latter being further provided with the ratchet-teeth and the cams $E^4$ on their rear sides, the ratchet-tumbler sleeves to engage said rear teeth, and the guide for the ratchet-bars, having the cam-faces to engage said cams $E^4$, substantially as described.

7. The combination of the ratchet-sleeves geared to the registering-disks, the ratchet-bars having the teeth on one side to engage said sleeves and having the teeth $B^4$ on their reverse sides, the weighted tumbler-ratchet sleeves having the teeth to engage the teeth $B^4$ of the ratchet-bars, and provided, further, with the teeth $R^3$, and the pawls engaging the latter teeth, substantially as described.

8. The combination, in a registering mechanism, of the shaft having the annular grooves $N'$, provided with offsets $O'$, and the registering-disks having the spring-pressed pins traveling in the grooves and adapted to engage the offsets, substantially as described.

9. The combination, in a registering mechanism, of the shaft having the offsets $O'$, the registering-disks loose on said shafts, and the spring-pressed pins carried by said disks to engage the offsets, and thereby carry the disks with the shaft when the latter is rotated in one direction, for the purpose set forth, substantially as described.

10. The combination of the shaft, the loose registering-disks thereon, the devices to lock the disks to the shaft when the latter is turned in one direction, the detent to engage and lock the shaft at predetermined points of its rotation, the registering-disk $S^5$, loose on the shaft and having the gear-wheel and arms or pins $R^5$, the latter corresponding in number to the points at which the shaft is locked, and the sleeve or gear having the pinion engaging the gear-wheel and the arms or teeth adapted to be engaged by the arms or pins $R^5$, substantially as described.

11. The combination of the banks of finger-keys denoting values in units, tens, and hundreds, respectively, the registering-disks indicating corresponding values, the sleeves geared to the registering-disks, connecting mechanisms between the several banks of keys and their respective sleeves to partly rotate the latter, whereby several values may be registered simultaneously by operating one key of each bank, and the automatic devices to complete the rotation of the sleeves, whereby units of a lower denomination will be carried to those of a higher denomination, substantially as described.

12. The combination of the banks of finger-keys denoting values in units, tens, and hundreds, respectively, the registering-disks indicating corresponding values, and the connecting operating mechanisms between said banks of keys and their corresponding disks, whereby several values may be registered at once by operating one key of each bank, substantially as described.

13. The combination of the finger-key arms and the spring-pressed pivoted lock-plate arranged above the normal position of the free ends of the arms and having the depending flange below its pivots and the offset or cam above the same, for the purpose set forth, substantially as described.

14. The combination, in a registering mechanism, of the display-tablet, the guides therefor, the weight-levers attached to the tablets, the finger-keys, the operating-rods attached thereto, and the tumbler-rods in the paths of the operating-rods and weight-levers, substantially as described.

15. The combination, in a registering mechanism, of the tablets, the guides therefor, the tumbler-rods, and connections to operate the tablets when said rods are raised, the collars or offsets on the rods, and the spring-pressed trip-bar having the cam in the paths of and above the collars or offsets, substantially as described.

16. The combination, in a registering mechanism, of the tablets, the guides therefor, the weighted bell-crank levers, the links connecting the same to the tablets, and the tumbler-rods and operating mechanism, substantially as described.

17. The combination of the finger-keys arranged in banks of different values in units, tens, and hundreds, the revoluble sleeves, connections, substantially as described, between the several banks of keys and their respective sleeves to partly rotate the latter when said keys are operated in one direction, the automatic devices to operate the sleeves at predetermined intervals of their rotation and connected to the keys and operated by the return-strokes thereof, and the registering-disks geared to the sleeves, substantially as described.

18. The combination of the revoluble sleeves having the tappets, the prime moving registering-disks geared to said sleeves, the dogs in the paths of the tappets, the detents normally engaged by the dogs, the finger-key arms, the ratchet-bars attached thereto and adapted to partly rotate the sleeves when moved in one direction, and the link-arms connected to the said ratchet-bars, having the shoulders to engage the sleeves and the cams or offsets to engage the detents, substantially as described.

19. The combination, in a registering mechanism, of the drawer, the hinged plate to lock the drawer, the springs to open the plate, the hooks to engage the latter when the drawer is closed, the finger-keys, the weight-arms operated thereby, and the rods attached to the hooks and adapted to be engaged and operated by the weight-arms when the latter are raised, for the purpose set forth, substantially as described.

20. The case having the inclined bottom, the drawer resting on friction-rollers thereon, the hinged plate to lock the drawer when closed, the finger-key arms and devices, operated thereby to release the hinged plate, substantially as described.

21. The combination of the gravity-drawer, the hinged plate to retain the same when closed, the springs to open said plate, the tappets on the drawer and hinged plate, for the purpose set forth, the hooks to engage and normally lock the plate, the finger-keys and the levers operated thereby, and connections between said levers and the hooks, substantially as described.

22. The combination of the drawer, the hinged plate to lock the same when closed, the tappets on the drawer and plate, the hooks to engage and lock the plate, the finger-key arms, the weight-arms operated thereby and having the tappets A', and the spring-pressed rods R, attached to the hooks and adapted to be engaged and operated by the tappets A', substantially as described.

In testimony whereof I have signed this specification in the presence of two subscribing witnesses.

JOHN SHARPE.

Witnesses:
HARRY S. ROHRER,
SCHUYLER DURYEE.